US008666823B2

(12) United States Patent
Spies et al.

(10) Patent No.: US 8,666,823 B2
(45) Date of Patent: Mar. 4, 2014

(54) SYSTEM FOR STRUCTURED ENCRYPTION OF PAYMENT CARD TRACK DATA

(75) Inventors: Terence Spies, Mountain View, CA (US); Matthew J. Pauker, San Francisco, CA (US); Jacob Green, Santa Monica, CA (US); Michael S. Leong, Redwood City, CA (US); Richard T. Minner, Carmichael, CA (US)

(73) Assignee: Voltage Security, Inc., Cupertino, CA (US)

( * ) Notice: Subject to any disclaimer, the term of this patent is extended or adjusted under 35 U.S.C. 154(b) by 242 days.

(21) Appl. No.: 13/078,822

(22) Filed: Apr. 1, 2011

(65) Prior Publication Data

US 2011/0246315 A1  Oct. 6, 2011

Related U.S. Application Data

(60) Provisional application No. 61/321,080, filed on Apr. 5, 2010, provisional application No. 61/381,012, filed on Sep. 8, 2010.

(51) Int. Cl.
G06Q 20/00 (2012.01)
G06Q 30/00 (2012.01)

(52) U.S. Cl.
USPC .................. 705/16; 705/66; 705/14

(58) Field of Classification Search
None
See application file for complete search history.

(56) References Cited

U.S. PATENT DOCUMENTS

| | | | |
|---|---|---|---|
| 5,283,829 A * | 2/1994 | Anderson | 705/40 |
| 5,432,326 A * | 7/1995 | Noblett et al. | 235/380 |
| 7,418,098 B1 | 8/2008 | Mattsson et al. | |
| 7,464,125 B1 * | 12/2008 | Orszag et al. | 1/1 |
| 7,580,898 B2 * | 8/2009 | Brown et al. | 705/75 |
| 7,738,717 B1 | 6/2010 | Palmer et al. | |
| 7,740,173 B2 | 6/2010 | Von Muller et al. | |
| 7,770,789 B2 | 8/2010 | Oder, II et al. | |
| 8,430,298 B2 * | 4/2013 | Martinez et al. | 235/375 |
| 2006/0005013 A1 * | 1/2006 | Huitema et al. | 713/162 |
| 2006/0031558 A1 * | 2/2006 | Ortega et al. | 709/232 |
| 2006/0049256 A1 * | 3/2006 | von Mueller et al. | 235/449 |
| 2007/0262138 A1 | 11/2007 | Somers et al. | |
| 2008/0103982 A1 * | 5/2008 | Hammad et al. | 705/66 |

(Continued)

FOREIGN PATENT DOCUMENTS

EP  1909212  4/2008

OTHER PUBLICATIONS

"Information Technology—Identification Cards—Financial Transaction Cards", ISO/IEC 7813:2006, International Standard, Jul. 1, 2006. Sixth Edition, Switzerland.

*Primary Examiner* — Mussa A Shaawat
*Assistant Examiner* — Ariel Yu
(74) *Attorney, Agent, or Firm* — Treyz Law Group; G. Victor Treyz; Michael H. Lyons

(57) ABSTRACT

A system may include a point-of-sale system that gathers payment card track data from a payment card and a payment card gateway that processes the track data to authorize purchase transactions. The point-of-sale system may remove sensitive data such as a portion of a primary account number from the track data and may compress the removed data. The compressed version of the data may be appended to a discretionary field in the track data. The discretionary field may be encrypted following insertion of the compressed data. Track data that has been modified in this way may be conveyed to the payment gateway for processing.

17 Claims, 4 Drawing Sheets

(56) References Cited

U.S. PATENT DOCUMENTS

2010/0111297 A1* 5/2010 Pauker et al. .................. 380/37
2010/0284532 A1 11/2010 Burnett et al.
2011/0022472 A1* 1/2011 Zon ........................... 705/14.64

* cited by examiner

SYSTEM FOR STRUCTURED ENCRYPTION OF PAYMENT CARD TRACK DATA

This application claims the benefit of provisional patent application No. 61/321,080, filed Apr. 5, 2010, and provisional patent application No. 61/381,012, filed Sep. 8, 2010, which are hereby incorporated by reference herein in their entireties.

BACKGROUND

This relates to card data such as payment card data and, more particularly, structured encryption of card data.

Credit cards and other payment cards are widely used in modern financial transactions. In a typical transaction, a cardholder swipes a payment card through a magnetic stripe reader associated with a point-of-sale system. The magnetic stripe reader extracts track data from the payment card. The point-of-sale system sends the track data to a remote payment gateway to determine whether the cardholder is authorized to make a purchase. If the cardholder is authorized, the cardholder's purchase may be charged to the cardholder's account.

The track data from a payment card may include sensitive information such as the cardholder's account number. Due to the sensitive nature of the track data, track data is generally only conveyed to payment gateways over secure links.

To ensure that track data cannot be easily intercepted, it may be desirable to encrypt the track data at or near the point-of-sale system. If care is not taken, however, the encryption process will significantly change the format of the track data. As a result, the encrypted version of the track data may not be compatible with systems that are interposed between the point-of-sale terminal and the payment gateway.

It would therefore be desirable to be able to provide improved ways in which to secure payment card track data.

SUMMARY

A point-of-sale system may have a card interface that gathers payment card track data from a payment card. The payment card track data may include sensitive information such as a primary account number and a card expiration date. The payment card track data may also include a discretionary field.

To ensure that sensitive information in the track data is secured, the sensitive information may be encrypted. The point-of-sale system may, for example, remove selected personal account number digits from the personal account number. The selected personal account number digits may be compressed by encoding the removed primary account number digits using an expanded character space. For example, at least some non-digit characters may be used in addition to digit characters to represent the selected personal account number digits. The compression process shortens the length of the selected personal account number data.

The compressed personal account number data may be appended to the discretionary field. The discretionary field may then be encrypted using an encryption technique such as format-preserving encryption.

Optional checksum adjustment information and information representing how many digits of the primary account number have been removed from the personal account number may be inserted into the primary account number. The checksum adjustment information may have a value that ensures that the primary account number has a valid checksum or may have a value that ensures that the primary account number has a checksum value that is offset from a valid checksum value by a predetermined amount. The offset checksum value may serve as a flag indicating that the track data has been encrypted.

Track data that has been modified to incorporate compressed sensitive data and that has been encrypted may be conveyed to the payment gateway for processing. The payment gateway may decrypt the discretionary field and reconstruct the original track data by decompressing the compressed sensitive track data.

Further features of the invention, its nature and various advantages will be more apparent from the accompanying drawings and the following detailed description of the preferred embodiments.

DETAILED DESCRIPTION

Figure 1:
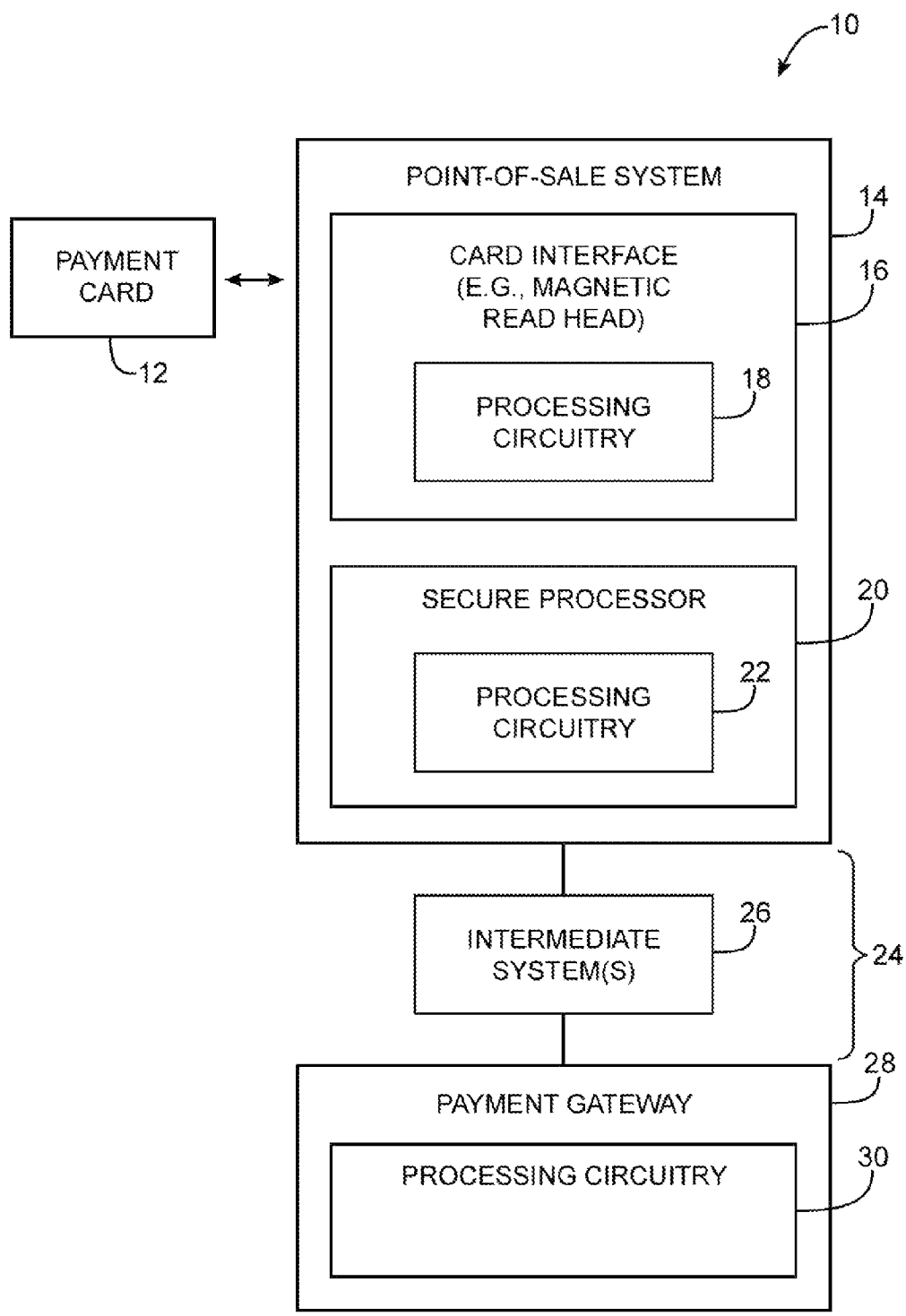
FIG. 1 is a system diagram of an illustrative system containing a point-of-sale system that receives payment card track data and a payment gateway that communicate over a communications network in accordance with an embodiment of the present invention.

In a typical payment card transaction, a user of a payment card swipes the card through a magnetic stripe reader in a point-of-sale system at a merchant. The magnetic stripe reader extracts track data from a magnetic stripe track on the card. The track data is transmitted over a network to a payment gateway or other computing equipment that handles activities associated with authorizing payment card transactions. The payment gateway, which is sometimes referred to as a host gateway, a payment card gateway, or a payment card data processor, may be associated with one or more credit card companies or other financial institutions that support payment card transactions. The payment gateway generally includes a database of information used in authorizing charges for payment cards.

Some point-of-sale systems may communicate directly with payment gateways. In other situations, one or more intermediate systems may be interposed between a point-of-sale system and a payment gateway. For example, a store with multiple check-out lines may have multiple point-of-sale systems that communicate with a centralized store controller. If the store is part of a chain of stores in a large company, each store may, in turn, use its store controller to communicate with a regional controller. The regional controller may then communicate directly with the payment gateway (as an example).

System architectures such as these may provide benefits for organizations that handle numerous payment card transactions. For example, store controllers may be helpful in aggregating payment card traffic from numerous point-of-sale systems in a store. Regional controllers may be used to implement fraud detection algorithms and may be used in preferentially routing payment card transactions among various available payment gateways (e.g., to balance traffic in a heavily loaded system).

If care is not taken, encryption operations at a point-of-sale terminal that are used to secure track data may change the format of the track data significantly. This may render the encrypted track data incompatible with one or more intermediate systems. For example, the encrypted track data may fail error checking process or may be incompatible with other error checking operations.

To ensure that sensitive data such as track data from a payment card is secured while still being able to pass through intermediate systems between a point-of-sale system and a payment gateway, processing circuitry at a point-of-sale terminal may perform structured encryption operations on the track data. The structured encryption operations ensure that the track data format is not altered significantly. This allows the modified track data to pass through intermediate systems successfully. Processing circuitry at a payment gateway (sometimes referred to as a host gateway) may perform corresponding decryption operations to recover the track data. The payment gateway may then process the track data. For example, the payment gateway may perform payment card authorization operations using the track data.

Various elements of track data on an International Organization for Standardization (ISO) 7813 formatted magnetic stripe card may be secured in this way. With one suitable arrangement, which is sometimes described herein as an example, primary account number (PAN) data within the track data is secured. If desired, other types of sensitive track data such as card expiration date data may be secured.

The primary account number is typically a 12-19 digit number. Each digit may have a value of 0-9. In the context of a credit card, the primary account number is sometimes referred to as the credit card number. Other types of cards (e.g., loyalty cards, debit cards, etc.) may also have an associated PAN. It is not always necessary or desirable to encrypt the entire PAN when securely conveying PAN data between a point-of-sale system and a payment processor. For example, it may be desirable to leave the last four digits of the PAN or the first six and the last four digits of the PAN unaltered (as examples). In scenarios such as these, it is only necessary to encrypt the leading or middle portion of the PAN.

To secure all or part of the PAN, the point-of-sale system may encode or encrypt the PAN data to alphanumeric characters or other characters in an expanded character space (i.e., a space with more valid values per character than the 10 valid values per digit in the original PAN data). The point-of-sale system may then shift the data to the discretionary data portion of the track data. This alters the format of the track data somewhat, but enables the track to pass various levels of format checking by intermediate systems between the track data reader and the decrypting payment gateway equipment.

An illustrative system of the type that may secure payment card track data is shown in FIG. 1. As shown in FIG. 1, system 10 may include a point-of-sale system such as point-of-sale system 14. Point-of-sale system 14 may include card interface 16. Card interface 16 may be used to obtain track data from payment card 12. For example, card interface 16 may include magnetic read head equipment for reading track data from a magnetic stripe on payment card 12. If desired, other types of payment cards may be used in system 10. For example, card 12 may be a smart card that contains one or more integrated circuits that store track data and/or perform card functions) or may be a wireless card that uses wireless circuitry for conveying track data. Use of magnetic stripe payment cards and a card interface that is based on a magnetic stripe reader may sometimes be described herein as an example. In general, payment card 12 may be any card or electronic equipment that contains payment data to be secured.

To enhance security, it may be desirable to embed processing circuitry 18 within card interface 16. For example, an integrated circuit processor may be embedded within a magnetic read head using a tamper-proof enclosure. This may help prevent an attacker from gaining access to unencrypted magnetic strip track data from card 12. An ancillary processor such as secure processor 20 may be provided within point-of-sale system 14 to allow point-of-sale system to perform processing tasks that might otherwise burden processing circuitry 18. Processing circuitry 18 in point-of-sale system 14 and processing circuitry 22 in secure processor 20 may communicate securely using a shared cryptographic key.

If desired, other architectures may be used for point-of-sale system 14. For example, arrangements that use only one processor may be used. The example of FIG. 1 is merely illustrative.

After obtaining track data from card 12 and securing at least some of the track data, point-of-sale system 14 may use processing circuitry such as processing circuitry 22 to transmit the secured track data to payment (host) gateway 28. The transmitted track data may pass through communications network 24. Communications network 24 may include local area network links, wide area network links, one or more intermediate systems 26 such as a store controller, a regional controller, etc. Intermediate systems 26 may not function properly if the format of the track data received from point-of-sale system 14 has been excessively modified. Point-of-sale system 14 therefore preferably uses a structured encryption technique in securing the track data. The structure encryption technique secures sensitive portions of the track data without changing the format of the track data excessively. This allows the modified track data to pass through intermediate systems 24 to payment gateway 28. At payment gateway 28, the track data may be processed using processing circuitry 30. For example, processing circuitry 30 may decrypt encrypted track data and may perform operations for authorizing a purchase transaction with payment card 12.

The International Organization for Standardization (ISO) 7813 specification details how card information (track data) is encoded on the magnetic stripe of a payment card. The specification sets for the acceptable format for two parallel tracks on the card, designated as Track 1 and Track 2. Each track contains a set of characters arranged as a fixed length string. Track 1 contains the following set of characters:

STX: Start sentinel "%"
FC: Format code "B"
PAN: Primary Account Number, up to 19 digits
FS: Separator "A"
NM: Name, 2 to 26 characters
FS: Separator "A"
ED: Expiration data, 4 digits or "A"
SC: Service code, 3 digits or "A"
DD: Discretionary data, balance of characters
ETX: End sentinel "?"
LRC: Longitudinal redundancy check
Track 1 is a maximum of 79 characters long.
Track 2 contains the following set of characters:
STX: Start sentinel ";"
PAN: Primary Account Number, up to 19 digits
FS: Separator "="
ED: Expiration date, YYMM or "=" if not present
SC: Service code, 3 digits or "=" if not present
DD: Discretionary data, balance of available digits ETX: End sentinel "?"
LRC: Longitudinal redundancy check
Track 2 is a maximum of 40 characters long.

To ensure that sensitive information such as PAN information is secured, all or part of the sensitive portions of the track data can be encrypted. For example, some or all of the PAN and/or expiration data fields or other portions of the track data may be encrypted. Illustrative arrangements in which a portion of a PAN is encrypted are sometimes described as an example. This is merely illustrative. An entire PAN and/or portions of other sensitive data within the track data may be encrypted if desired.

The PAN encryption techniques may be implemented at point-of-sale system 14 using processing circuitry such as processing circuitry 22. Corresponding decryption techniques may be used to perform decryption at payment gateway 28 using processing circuitry 30 (i.e., using the key that is shared between the point-of-sale processing circuitry and the payment gateway processing circuitry).

Track data encryption may involve transforming the entire PAN or a subset of the PAN digits in the track data into a compressed string of digits or alphanumeric characters (e.g., an encrypted or encoded string). Compression may involve encoding the PAN digits using an enlarged character space (e.g., without encrypting the PAN digits) or may involve encryption into an expanded character space. The compressed PAN data may include randomizing characters (also known as a tweak) that causes two compressions (e.g., encryptions) of the same data to result in different output strings (e.g., different ciphertext).

An illustrative compression technique that may be applied to track data such as PAN digits is sometimes referred to as PANER2. PANER2 takes a string of n digits (2<n<20) and encrypts them to a smaller set of alphanumeric digits. The output will be smaller than the input, because the output is encoded in a larger character space than the input. For example, each character of the input may be a digit that has a value of 0-9, whereas each character of the output may be an alphanumeric character that has a value of 0-9 or A-Z (as an example). The larger number of values available for each of the output characters allows more bits to be encoded per character. If there are m possible alphanumeric digits (as an example, m will be 36 for just numbers and uppercase alphabetic characters, or m will be 62 for numbers and upper/lower alphabetic characters), the output will encode $\log_2(m)$ bits per character. The input will contain $x=\log_2(n^{10})$ bits of information, so the output will contain $x \log_2(m)$ output characters.

Sensitive track data such as selected PAN digits may be secured using a track data encryption procedure that is sometimes referred to as TEP2. The TEP2 procedure removes the central digits of the PAN data (or other selected digits), leaving the first six (which form the Bank Identification Number) and last four (the confirmation digits) in the PAN field of the track data. The central digits are compressed (e.g., encoded and/or encrypted). For example, the central digits may be compressed using PANER2. The compressed digits may then be inserted into the discretionary data field of the track data (e.g., by appending the compressed digits to the end of the discretionary field).

TEP2 takes a single parameter d, which is the required length of the shortened PAN (sometimes referred to as the stub PAN) that will be left in the PAN field of the track. The shortened PAN consists of the first six digits of the original (plaintext) PAN, a set of dummy digits, and the last four digits of the original (plaintext) PAN. In a preferred embodiment, the d value must range from 11 to 19.

TEP2 will, in one embodiment, preserve the Luhn checksum of the shortened PAN. The Luhn checksum is a checksum value that typically occupies the last digit in a valid PAN and is used for error checking the PAN. In this case, d must range from 12 to 19, as a checksum adjustment value will be included in the PAN to adjust the shortened PAN checksum. In embodiments in which an application requires an "obviously encrypted mode" in which the Luhn checksum is not correct, the Luhn checksum correction value may be a valid Luhn checksum digit that is offset by a constant value (by default, by adding 1) to create a recognizably invalid checksum.

After compressing (e.g., encrypting) the removed central PAN digits and placing these compressed PAN digits in the discretionary data field, TEP2 encrypts the discretionary data field. With one suitable arrangement, the discretionary data field is encrypted to base 64 alphanumeric characters, which will shrink the discretionary field. The field is then padded to keep the required length. With another suitable arrangement, a format-preserving encryption (FPE) algorithm is used to perform an encryption operation that maps the encrypted output to a valid set of discretionary field characters.

Figure 2:
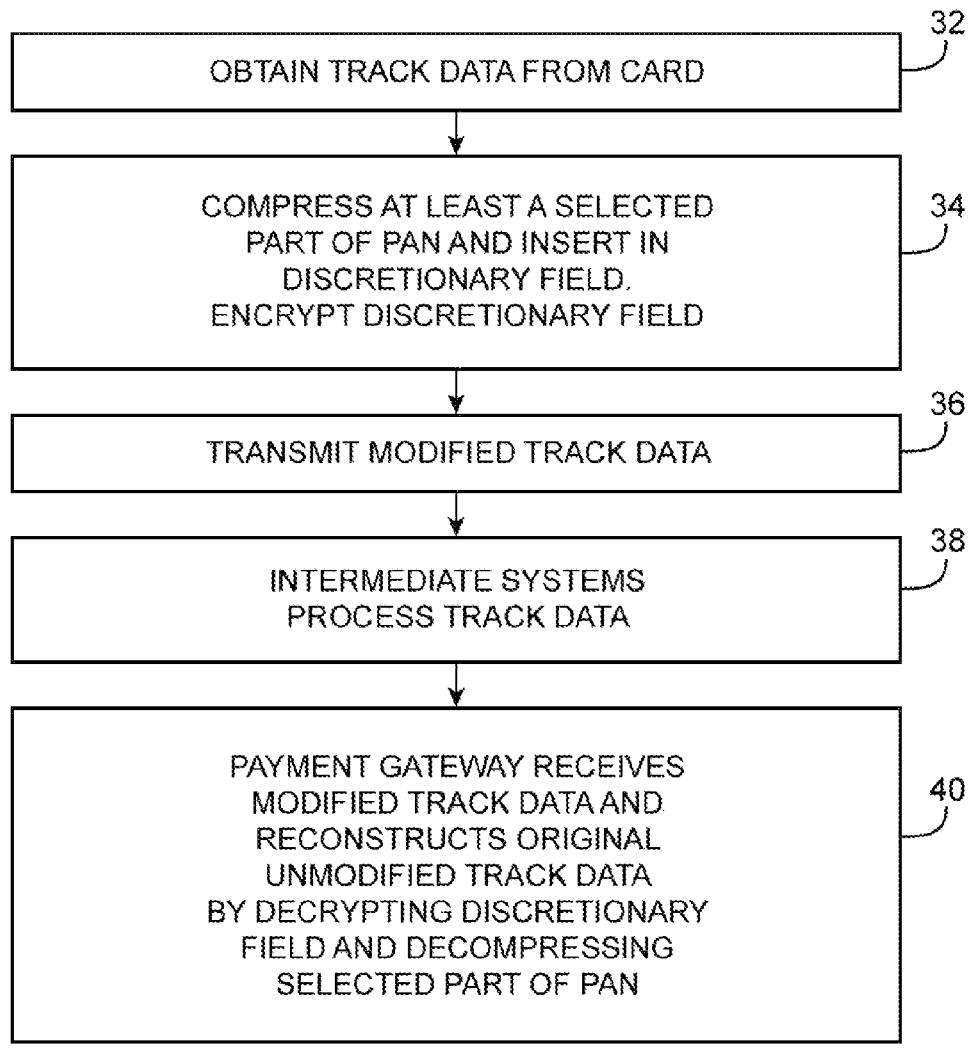
FIG. 2 is a flow chart of illustrative steps involved in securely conveying payment card data from a point-of-sale system to a payment gateway in accordance with an embodiment of the present invention.

Illustrative steps involved in using system 10 of FIG. 1 to securely convey payment card track data between systems such as point-of-sale system 14 and payment gateway 28 are shown in FIG. 2.

At step 32, point-of-sale system 14 may obtain track card data from payment card 12. For example, a user may swipe card 12 through a magnetic stripe reader, so that processing circuitry 18 receives the track card data. Processing circuitry 18 and processing circuitry 22 may share a cryptographic key. Processing circuitry 18 can use the shared key to encrypt the track card data. Processing circuitry 22 may receive the encrypted track card data from processing circuitry 18 and may decrypt the encrypted track card data using the shared key. (A separate key may be shared between processing circuitry 22 and payment gateway processing circuitry 30.)

At step 34, at least part of the PAN (or other sensitive information) may be compressed. The PAN digits that are compressed may be compressed by encoding the PAN digits using an expanded character set (e.g., alphanumeric characters in place of digits). The compressed PAN digits occupy fewer characters in total than the uncompressed PAN digits. For example, if the portion of the PAN field that is being compressed is made up of 6 PAN digits (i.e., a digit string of length 6), the corresponding compressed version of the 6 PAN digits may be made up of 4 alphanumeric characters (i.e., the length of the PAN data may be reduced from 6 to 4 by encoding the PAN data using an expanded character set).

If desired, the compression operations of step 34 may be implemented using an encryption algorithm. For example, a format-preserving-encryption (FPE) algorithm may be used such as the FFX mode of AES. The use of an FPE encryption algorithm may allow the structure of the encrypted data to be preserved (versus traditional encryption approaches which render the encrypted data into a binary field). For example, the FPE algorithm may be used to encrypt 6 PAN digits into 4 alphanumeric characters, thereby compressing the PAN data.

During the operations of step 34, the compressed PAN data may be inserted into the discretionary field of the track data and the discretionary field may be encrypted. During the discretionary field encryption process, the compressed PAN data that was contained in the discretionary field is encrypted with the rest of the discretionary field data.

At step 36, the modified track data may be transmitted from processing circuitry 22 to processing circuitry 30 over network 24. During the operations of step 38, optional intermediate systems that may be interposed between processing circuitry 22 and processing circuitry 30 may process the transmitted track data (e.g., for error checking, etc.). The format of the modified track data that is transmitted from processing circuitry 22 is preferably sufficiently close in format to the original track data that the modified track data may successfully pass through intermediate systems 26.

At step 40, payment gateway 28 may use processing circuitry 30 to receive the modified track data. Processing circuitry 30 may reconstruct the original unmodified track data by decrypting the discretionary field and decompressing the compressed PAN data. The encryption operations of step 34 and the decryption operations of step 40 may be performed using a cryptographic key (e.g., a symmetric key) that is shared by processing circuitry 22 at point-of-sale system 14 and processing circuitry 30 at payment gateway. The cryptographic key may be distributed to processing circuitry 22 and processing circuitry 30 using any suitable key sharing scheme (e.g., by physical distribution, by downloading over a secure channel, using identity-based encryption (IBE) encryption and/or IBE key sharing schemes, etc.).

Figure 3:
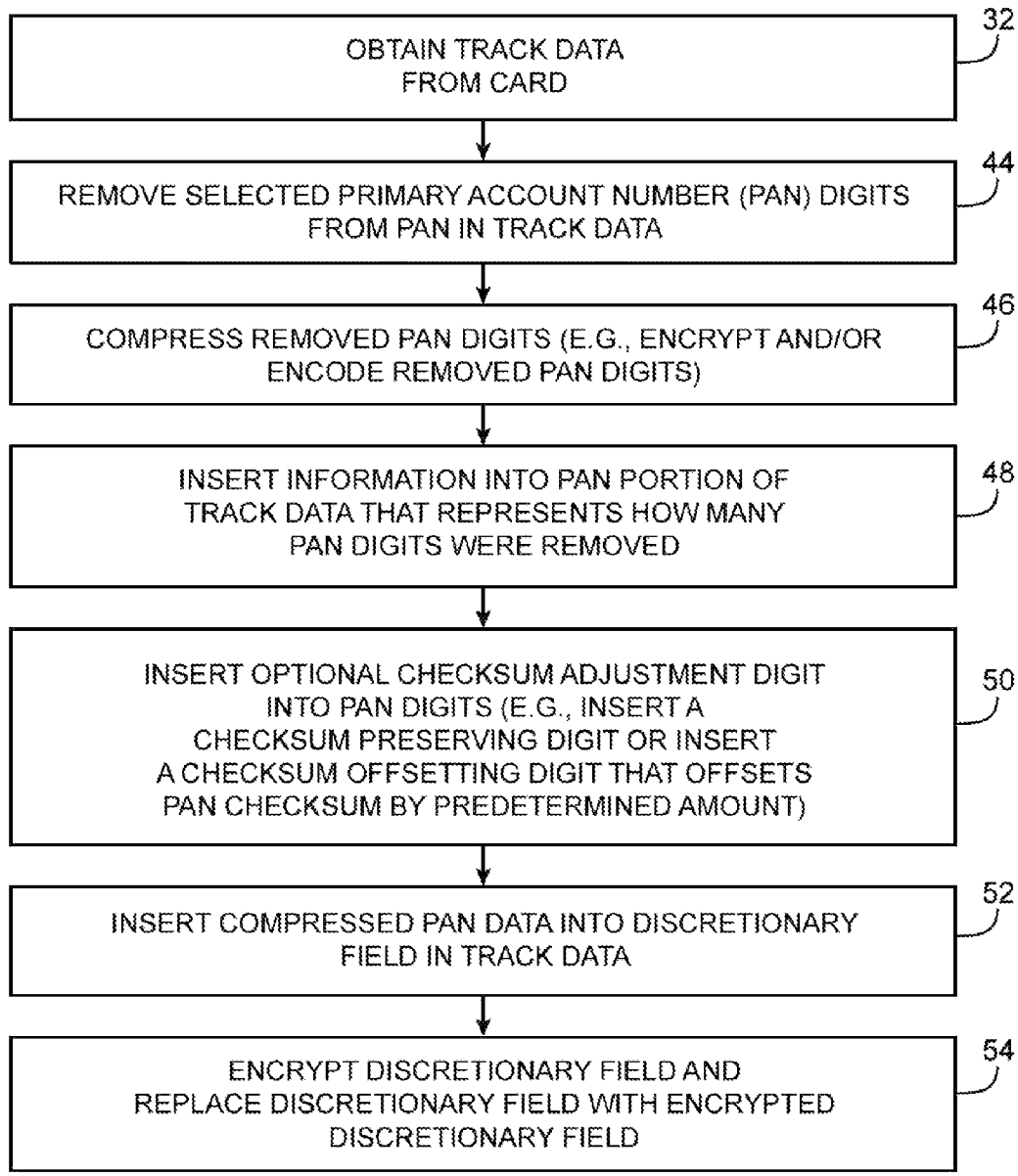
FIG. 3 is a flow chart of illustrative steps involved in encrypting track data in accordance with an embodiment of the present invention.

Illustrative steps in performing the track modification operations of step 34 (e.g., use of the TEP2 procedure for encryption, etc.) are shown in FIG. 3.

At step 32, point-of-sale terminal 14 may obtain the card track data from payment card 12. As an example, point-of-sale system 14 may obtain the following track data:

%
B1111112222223333^MICHAELJONES^0000^835^000000000000000000000000000000000000?9

As shown in this illustrative track data, the original unmodified track data may include a start character ("%") and a corresponding end character ("?") followed by a checksum for the entire track (9 in the current example). The second character in the track data ("B") specifies that the track is using the payment industry format (as opposed to other formats such as loyalty card formats). The digits following the "B" character make up the PAN (i.e., the PAN is "1111112222223333". The "^" symbols are separators. The cardholder name in this example is "MICHAEL JONES". The expiration date (immediately following the cardholder name) is "0000". The digits "835" represent a service code. This code, which is private to the card issuer, may be used to represent information such as which discounts are associated with the card, etc. The discretionary field of the track data in this example consists of the string between the last separator and the end character (i.e., the discretionary field is "000000000000000000000000000000000000").

After obtaining the original unmodified version of the track data from payment card 12 at step 32, processing circuitry 22 may remove a portion of the PAN (or other sensitive portion of the track data such as an expiration date, etc.) at step 44. For example, the m central digits of PAN data between the first six and last four digits of the PAN may be removed. If, as an example, the PAN is made up of 16 digits (as in the case of a 16 digit PAN for VISA® or MasterCard® cards), the value of m will be 6 and 6 PAN digits will be removed from the PAN during the operations of step 44.

Following removal of the PAN digits, the track data will appear as follows:

%
B1111113333^MICHAELJONES^0000^835^000000000000000000000000000000000000?9

At step 46, the removed PAN digits may be compressed to form n corresponding characters (e.g., alphanumeric characters). For example, the PAN digits may be encoded using an expanded character set to shorten the total length of the PAN digits. By representing the removed PAN digits in alphanumeric characters instead of digit characters, the six removed PAN digits will be losslessly compressed to four corresponding alphanumeric characters (i.e., the length of the remove PAN digits will be compressed from m=6 to n=4). The compression operations of step 46 may be performed using an encoding engine implemented using processing circuitry 22, using a format preserving encryption operation implemented using processing circuitry 22, etc.

In the present example, encryption of the 6 middle digits of the PAN results in corresponding compressed data characters (i.e., encoded and/or encrypted characters "XXXX"). The length of the 6 middle digits (each of which has a value of 0-9) is shortened to 4 by representing the six PAN digits in an expanded character spaced (e.g., a character space using at least some non-digit characters such as letters in addition to digit characters—i.e., alphanumeric characters each of which has a value of 0-9, A-Z). If desired, other expanded character spaces may be used during compression.

At step 48, information may be inserted into the track to indicate how many PAN digits were removed. For example, the number "6" may be inserted into the central portion of the PAN digits in the location from which the six PAN digits "222222" were removed, thereby indicating that six PAN digits were removed. Following step 48, the track data may appear as follows:

%
B1111116 3333^MICHAELJONES^0000^835^00000000000000000000000000000000000?9

At step 50, an optional checksum adjustment digit may be inserted into the track data. For example, a checksum adjustment digit having a value of 0-9 may be inserted where indicated by the character "C" in the following version of the track data:

%
B1111116C3333^MICHAELJONES^0000^835^000000000000000000000000000000000000?9

If desired, the checksum adjustment digit may be omitted. If the checksum adjustment digit is omitted, the checksum of the modified PAN will not always be valid.

The checksum adjustment digit that is inserted may be computed to have the value necessary to ensure that the checksum of the modified PAN will be valid. The last digit of the PAN is normally a checksum digit. Following modification of the PAN, the checksum that is computed for the PAN may not match the checksum represented by the last digit of the PAN. In the presence of the inserted checksum adjustment digit, however, the computed checksum of the PAN will match the checksum represented by the last digit, allowing the modified track to pass through intermediate systems that perform this type of checking.

Another possible use of the checksum adjustment digit is to serve as a flag that indicates that the track data has been encrypted (i.e., a flag that indicates that the track data contains encrypted PAN information). With this type of approach, the checksum adjustment digit may be an offset checksum value that is offset by a known amount from the value needed to produce a valid checksum. If, for example, a digit of value "4" would ensure that the PAN would have a valid checksum, the checksum adjustment digit that is inserted into the PAN at step 50 may be "5" (i.e., the value of 4 plus a known offset value of 1). When received by the payment gateway or other systems, the payment gateway (or other system) may recognize the presence of the known offset and may therefore conclude that the track data has been processed (e.g., encrypted, etc.).

Some intermediate systems may not check the checksum value, so omission of the checksum adjustment value may be acceptable. Intermediate systems may also be alerted as to whether or not part of the PAN has been encrypted by the characteristics of the track data, allowing appropriately configured intermediate systems to take appropriate action (e.g., by skipping checksum checking operations, etc.). In arrangements in which the checksum adjustment digit produces an invalid checksum at a known offset from the valid checksum, the presence of the invalid checksum having the known offset from a valid checksum can indicate the presence of encryption. In arrangements in which the length of the PAN has been shortened, systems can also detect that the PAN length deviates from an expected nominal length or is less than the minimum expected length (e.g., a system may detect that the PAN has been shortened to less than 12 digits and can therefore conclude that the track data has been encrypted).

Following use of one of these three approaches (1. no checksum adjustment digit, 2. inclusion of a checksum adjustment digit that produces a valid checksum, or 3. inclusion of a checksum adjustment digit that produces an invalid checksum equal to a valid checksum offset by predetermined amount), the compressed PAN data may be inserted into the discretionary field of the track data to create a modified discretionary field at step 52. The compressed PAN data (i.e., the characters "XXXX") may, for example, be appended to the end of the discretionary field. Because the PAN data has been compressed, the overall size of the data track will not become too large, even though additional characters have been inserted into the PAN during the operations of step 48 and 50. For example, even if two additional characters were added during the operations of step 48 and 50, space in the track data for two additional characters can be created by compressing the 6 digits of PAN data into 4 digits of compressed PAN data.

Following insertion of the compressed PAN digits, the track data (in this example) will appear as follows:

%
B1111116C3333^MICHAELJONES^0000^835^000000000000000000000000000000000000XXXX?9

At step 54, the discretionary field may be encrypted. The discretionary field may, for example, be encrypted using an FPE encryption scheme or other scheme that preserves the format of the discretionary track. Following encryption of the discretionary field of the track data, the track data will, in this example, appear as follows:

%
B1111116C3333^MICHAELJONES^0000^835^YYYYYYYYYYYYYYYYYYYYYYYYYYYYYYYYYYYYYYY?9

As described in connection with FIG. 2, the modified version of the track data may be transmitted to the payment gateway for processing.

Figure 4:
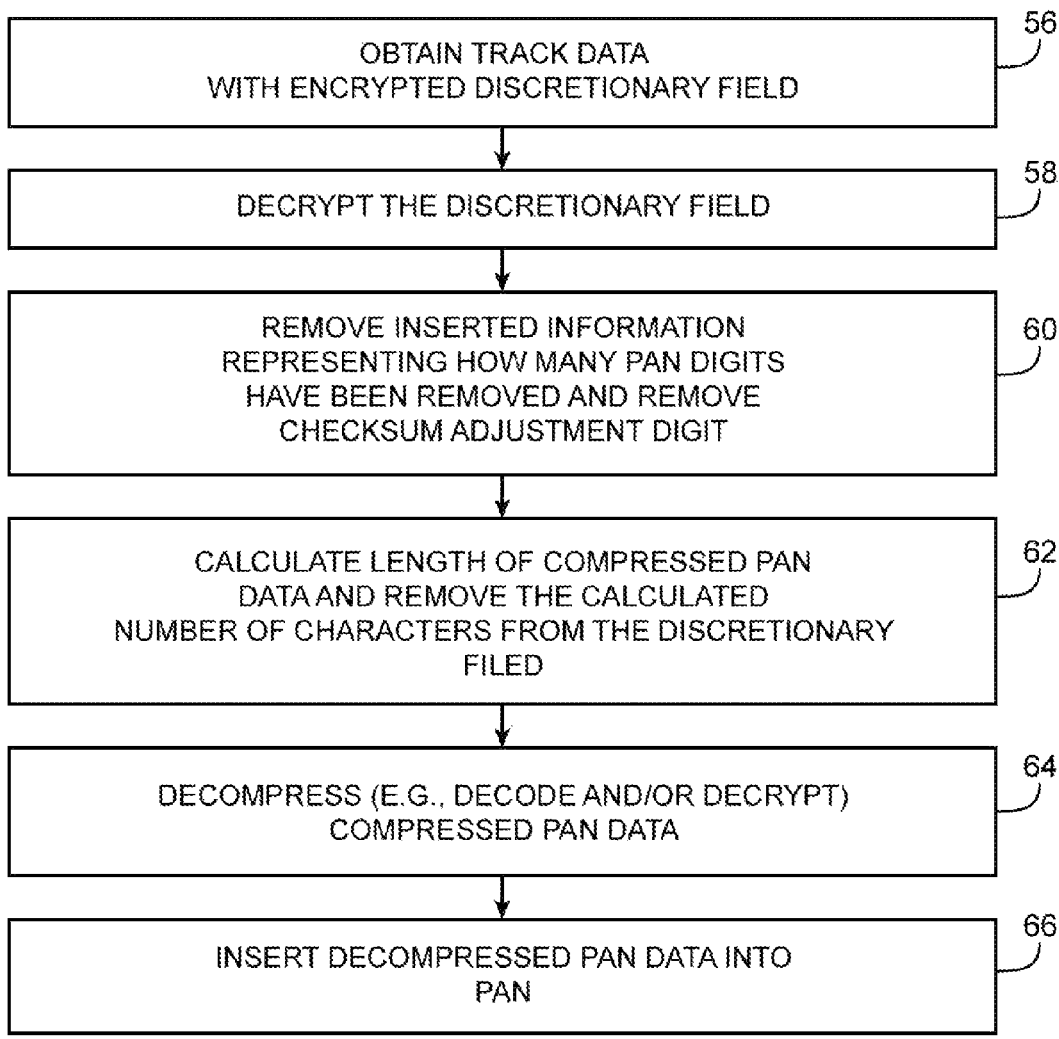
FIG. 4 is a flow chart of illustrative steps involved in decrypting track data in accordance with an embodiment of the present invention.

When the payment gateway receives the track data, the payment gateway can reconstruct the original track data using a process of the type shown in FIG. 4.

As shown in FIG. 4, the payment gateway may receive the track data from the point-of-sale system at step 56.

At step 58, the payment gateway may decrypt the discretionary field in the track data using a symmetric key that has been shared with the point-of-sale system (i.e., processing circuitry 30 may use the same cryptographic algorithm and the same key that was used in encrypting the discretionary track at step 54 of FIG. 3 in decrypting the discretionary track).

Before decryption of the discretionary track, the track data appears as follows:

%
B1111116C3333^MICHAELJONES^0000^835^YYYYYYYYYYYYYYYYYYYYYYYYYYYYYYYYYYYYYYY?9

Following decryption of the discretionary track during the operations of step 58, the track data appears as follows:

%
B1111116C3333^MICHAELJONES^0000^835^000000000000000000000000000000000000XXXX?9

During the operations of step 60, processing circuitry 30 may remove the information that represents how many PAN digits were removed from the PAN from the track data and may remove the checksum adjustment digit. Following these operations, the track data may appear as follows:

%
B1111113333^MICHAELJONES^0000^835^000000000000000000000000000000000000XXXX?9

In this example, the digits "6" and "C" were removed. The digit "6" represents how many PAN digits were removed from the PAN. The digit "C" is the optional checksum adjustment digit (having a value of 0-9). Using the extracted information on how many PAN digits were removed from the PAN (i.e., using the value of "6" in this example), processing circuitry 30 computes how many compressed PAN characters were inserted into the discretionary field at the point-of-sale system (i.e., processing circuitry may calculate the length of the compressed PAN data from the length value "6"). Processing circuitry 30 may make this calculation based on knowledge of which character spaces were used in representing the compressed and uncompressed versions of the PAN data. Processing circuitry 30 may, in this example, compute that 4 compressed characters were inserted (based on the "6" value extracted during step 60). The computed number of compressed characters (i.e., 4 compressed characters) may then be extracted from the discretionary field (e.g., the 4-character string "XXXX" in the present example may be removed from the end of the field).

Following removal of the compressed PAN data, the track data may appear as follows:

%
B1111113333^MICHAELJONES^0000^835^00000000000000000000000000000000000000?9

At step 64, the extracted compressed PAN data may be decompressed (e.g., by using a decoding operation and/or an FPE decryption operation that reverses the compression operation of step 46 of FIG. 3). In the present example, the compressed PAN characters "XXXX" are decompressed to form the original uncompressed PAN digits "222222" that were removed from the center of the PAN.

At step 66, the uncompressed PAN digits that have been recovered can be inserted into the PAN (e.g., in the predetermined center position of the PAN following the first six digits and before the last four digits or at another predefined location).

Following insertion of the uncompressed PAN portion, the track data will be fully reconstructed to its original form and will appear as follows:

%
B1111112222223333^MICHAELJONES^0000^835^00000000000000000000000000000000?9

If desired, other types of track data may be encrypted (and decrypted) in this way. For example, payment card expiration date data may be encrypted by compressing the payment card expiration date data and placing this compressed information in the discretionary field. If desired, a number of different parts of the track data may be compressed and added together to form a contiguous addition to the end of the discretionary track field. The use of a contiguous region at the end of the discretionary track field to hold compressed data from multiple portions of the track data may help reduce the complexity of track data processing operations.

Although sometimes described in the context of illustrative card track data such as magnetic card track data and payment card data, other types of card data may be secured using these techniques if desired. For example, card data from smart cards and wireless cards may be secured in addition to card data from magnetic stripe cards. Card data from magnetic cards, smart cards, and wireless cards other than payment cards may also be secured. The use of magnetic track data and payment card track data is merely illustrative.

The foregoing is merely illustrative of the principles of this invention and various modifications can be made by those skilled in the art without departing from the scope and spirit of the invention.

What is claimed is:

1. A method for securing data conveyed over a communications network between a point-of-sale system that receives track data from payment cards and a payment gateway that performs payment card authorization operations, comprising:
   with processing circuitry at the point-of-sale system, obtaining track data from a payment card;
   with the processing circuitry at the point-of-sale system, removing selected primary account number digits from a primary account number in the track data;
   with the processing circuitry at the point-of sale system, forming compressed primary account number data by compressing the removed primary account number digits; and
   with the processing circuitry at the point-of sale system, inserting the compressed primary account number data into a discretionary field of the track data creating a modified discretionary field;
   with the processing circuitry, following insertion of the compressed primary account number data into the discretionary field creating the modified discretionary field, encrypting the modified discretionary field;
   with the processing circuitry, determining how many of the selected primary account number digits were removed from the primary account number in the track data; and
   with the processing circuitry, inserting information into the primary account number digits in the track data that represents how many of the selected primary account number digits were removed.

2. The method defined in claim 1, wherein compressing the removed primary account number digits comprises encoding the removed primary account number digits using alphanumeric characters.

3. The method defined in claim 2, wherein the primary account number has four trailing digits and wherein removing the selected primary account number digits comprises removing digits from the primary account number other than the four trailing digits.

4. The method defined in claim 3, wherein the primary account number has six leading digits and wherein removing the selected primary account number digits comprises removing all digits from the primary account number between the six leading digits and the four trailing digits.

5. The method defined in claim 1 further comprising:
   inserting a checksum adjustment value into the primary account number digits.

6. The method defined in claim 5 wherein inserting the information into the primary account number digits comprises inserting at least a first digit and wherein inserting the checksum adjustment value into the primary account number digits comprises inserting a second digit.

7. The method defined in claim 6 wherein the first and second digits are inserted adjacent to one another within the primary account number digits and wherein the checksum adjustment value is selected by the processing circuitry to make a checksum of the primary account number digits that includes the first and second digits valid.

8. The method defined in claim 6 wherein the first and second digits are inserted adjacent to one another within the primary account number digits and wherein the checksum adjustment value comprises an offset checksum value that is selected by the processing circuitry to make a checksum of the primary account number digits including the first and second digits invalid and offset by a predetermined amount from a valid checksum value for the primary account number digits.

9. The method defined in claim 1 further comprising:
   transmitting the track data with the encrypted modified discretionary field to the payment gateway from the point-of-sale system through at least one interposed system.

10. The method defined in claim 9 further comprising:
    with processing circuitry at the payment gateway, decrypting the encrypted modified discretionary field.

11. The method defined in claim 10 further comprising:
    with processing circuitry at the payment gateway, extracting the compressed primary account number data from the modified discretionary field following decryption of the encrypted modified discretionary field.

12. A method for securing data conveyed over a communications network between a point-of-sale system that receives track data from payment cards and a payment gateway that performs payment card authorization operations, wherein the track data includes personal account number data and a discretionary field, the method comprising:
    with processing circuitry at the point-of-sale system, removing selected track data from the track data and producing compressed track data by compressing the selected track data, wherein the selected track data has a length and wherein the compressed track data has a length that is shorter than the length of the selected track data;
    with the processing circuitry, inserting the compressed track data into the discretionary field;
    with the processing circuitry, following insertion of the compressed track data into the discretionary field, encrypting the discretionary field;
    with the processing circuitry, determining how much of the selected track data was removed from the track data; and
    with the processing circuitry, inserting information into the track data that represents how much of the selected track data was removed.

13. The method defined in claim 12 wherein the selected track data comprises part of the primary account number and wherein compressing the selected track data comprises encoding the part of the primary account number using a character space that includes at least some non-digit characters.

14. The method defined in claim 12 wherein the selected track data includes payment card expiration date data and wherein compressing the selected track data comprises compressing the payment card expiration date data.

15. The method defined in claim 12 further comprising:
with the processing circuitry at the point-of-sale system, encrypting the discretionary field using format preserving encryption.

16. A method for processing payment card track data at a point-of-sale system, the method comprising:
with processing circuitry at the point-of-sale system, removing a part of the payment card track data, wherein the removed part of the payment card track data has a number of digits;
with the processing circuitry, generating a compressed part of the payment card track data by losslessly compressing the removed part of the payment card track data so that the payment card track data shrinks from a first length to a second length that is shorter than the first length; and
with the processing circuitry, inserting the compressed part of the payment card track data into a discretionary field in the payment card track data;
with the processing circuitry, encrypting the discretionary field after the compressed part of the payment card track data has been inserted into the discretionary field;
with the processing circuitry, determining the number of digits of the removed part of the payment card track data; and
with the processing circuitry, inserting information into the payment card track data that represents the number of digits in the removed part of the payment card track data.

17. The method defined in claim 16 further comprising:
with the processing circuitry, removing the part of the payment card track data from a primary account number portion of the payment card track data; and
with the processing circuitry, transmitting the payment card track data from which the part of the payment card track data has been removed and in which the discretionary field has been encrypted through a network.

* * * * *